(12) United States Patent
Johnson

(10) Patent No.: US 8,730,763 B2
(45) Date of Patent: May 20, 2014

(54) METHODS AND APPARATUS TO OPTIMIZE PARAMETERS IN A DOWNHOLE ENVIRONMENT

(75) Inventor: David Linton Johnson, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 13/104,010

(22) Filed: May 9, 2011

(65) Prior Publication Data

US 2012/0287754 A1  Nov. 15, 2012

(51) Int. Cl.
*G01V 1/00* (2006.01)
*G01V 1/50* (2006.01)
*G01V 1/44* (2006.01)

(52) U.S. Cl.
CPC .... *G01V 1/50* (2013.01); *G01V 1/44* (2013.01)
USPC ................................. 367/35; 367/31; 367/46

(58) Field of Classification Search
CPC ............ G01V 1/50; G01V 1/44; G01V 1/368
USPC ...................................... 367/31, 46
See application file for complete search history.

(56) References Cited

U.S. PATENT DOCUMENTS

| 5,475,650 | A * | 12/1995 | Sinha et al. | 367/31 |
| 6,308,137 | B1 | 10/2001 | Underhill et al. | |
| 2005/0000688 | A1* | 1/2005 | Hsu et al. | 166/254.2 |
| 2006/0083108 | A1* | 4/2006 | Wu | 367/31 |
| 2006/0120217 | A1* | 6/2006 | Wu et al. | 367/32 |
| 2006/0256655 | A1* | 11/2006 | Sinha et al. | 367/31 |
| 2009/0185445 | A1* | 7/2009 | Yogeswaren et al. | 367/25 |

OTHER PUBLICATIONS

Aroyo "Sonic investigation in and around borehole", Oilfield Review, Spring 2006, pp. 14-33.*
Bikash K. Sinha, Ergun Simsek and Sergey Asvadurov, "Influence of a Pipe Tool on Borehole Modes", Geophysics vol. 74, No. 3, May-Jun. 2009, pp. E111-E123.

* cited by examiner

*Primary Examiner* — Isam Alsomiri
*Assistant Examiner* — Hovhannes Baghdasaryan
(74) *Attorney, Agent, or Firm* — Daryl R. Wright; Brigitte Echols

(57) ABSTRACT

Methods and apparatus to optimize parameters in a downhole environment are described. An example downhole tool includes a transmitter to transmit a signal into a subterranean formation and one or more receivers to receive at least a portion of the acoustic signal. The downhole tool also includes a processor configured to determine slownesses of different acoustic modes at a frequency of the signal received. Each of the slownesses is associated with a first parameter and a second parameter. The different acoustic modes have substantially different sensitivities to at least one of the first parameter or the second parameter. The processor to invert the determined slownesses of the different acoustic modes to determine an optimized value of the first parameter and an optimized value of the second parameter.

22 Claims, 4 Drawing Sheets

METHODS AND APPARATUS TO OPTIMIZE PARAMETERS IN A DOWNHOLE ENVIRONMENT

FIELD OF THE DISCLOSURE

This patent relates generally to formation analysis and, more particularly, to methods and apparatus to optimize parameters in a downhole environment.

BACKGROUND

During sampling and/or drilling operations, sonic measurements may be obtained using a downhole tool to identify formation parameters, for example. These formation parameters may be used to obtain a better understanding of the formation. However, in some instances, multiple formation parameters may not be measured, thereby making it difficult to identify optimized values for these formation parameters.

SUMMARY

An example method of optimizing values of a plurality of parameters in a downhole environment includes transmitting a signal from a transmitter into a formation and receiving the signal at a receiver spaced from the transmitter. The method also includes determining a first slowness of a first acoustic mode at a plurality of frequencies of the received signal. The first slowness is associated with a first parameter and a second parameter. The method also includes determining a second slowness of a second acoustic mode at the plurality of frequencies of the received signal. The second slowness is associated with the first parameter and the second parameter. The method also includes inverting the first slowness and the second slowness to determine an optimized value of the first parameter and an optimized value of the second parameter. The first and second acoustic modes have substantially different respective sensitivities to each of the first and second parameters.

Another example method of optimizing values of a plurality of parameters in a downhole environment includes transmitting a signal from a transmitter into a formation and receiving the signal at a receiver spaced from the transmitter. The method also includes determining a measured first slowness and theoretical first slownesses of a first acoustic mode at a plurality of frequencies of the received signal. The measured first slowness is associated with a first parameter and a second parameter. The theoretical first slownesses is determined using first parameter values and second parameter values. The method also includes determining a measured second slowness and theoretical second slownesses of a second acoustic mode at the plurality of frequencies of the received signal. The measured second slowness is associated with the first parameter and the second parameter. The theoretical second slownesses is determined using first parameter values and second parameter values. The method also includes determining an optimized value of the first parameter and an optimized value of the second parameter by identifying one of the theoretical first slownesses that is substantially similar to the measured first slowness and one of the theoretical second slownesses that is substantially similar to the measured second slowness. The first and second acoustic modes have substantially different respective sensitivities to at least one of the first parameter or the second parameter.

An example downhole tool includes a transmitter to transmit a signal into a subterranean formation and one or more receivers to receive at least a portion of the acoustic signal. The downhole tool also includes a processor configured to determine slownesses of different acoustic modes at a frequency of the signal received. Each of the slownesses is associated with a first parameter and a second parameter. The different acoustic modes have substantially different sensitivities to at least one of the first parameter or the second parameter. The processor is to invert the determined slownesses of the different acoustic modes to determine an optimized value of the first parameter and an optimized value of the second parameter.

DETAILED DESCRIPTION

Figure 1:
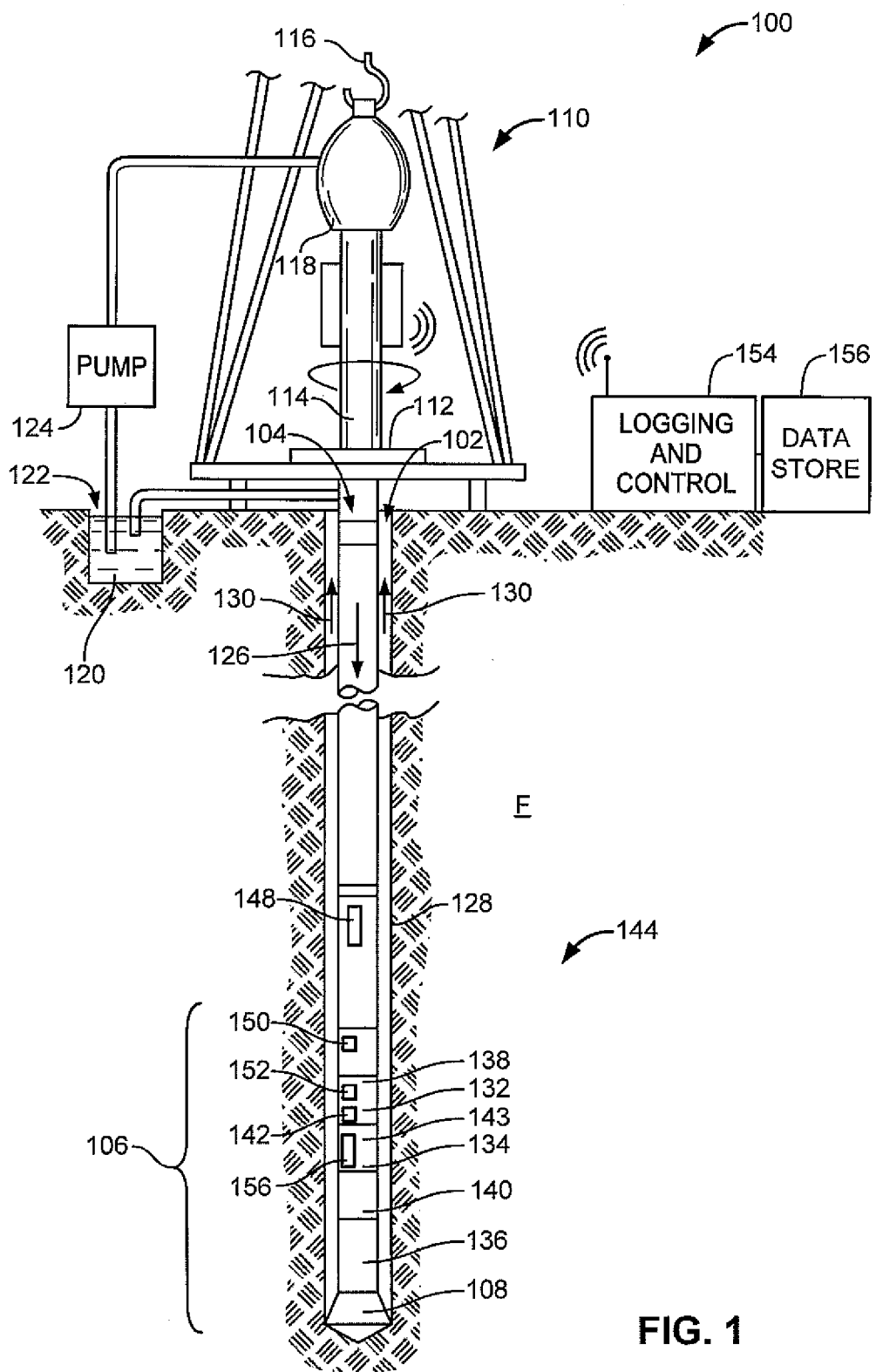
FIG. 1 depicts an example wellsite drilling system.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The examples described herein relate to methods, systems and apparatus to determine optimized values for parameters using different acoustic modes (e.g., modes of propagation) in a downhole environment. More specifically, the examples described herein relate to deducing measured slownesses for unmeasured parameters (e.g., initially unknown parameters) by varying values of those parameters in a series of theoretical forward modeling calculations (e.g., performing a non-linear squares fitting analysis) to identify a best-fit agreement between the measured slownesses and the theoretical slownesses. The measured slownesses may be of different acoustic modes to enable determination of the unmeasured parameters more accurately than is possible using known approaches. The parameters may include formation shear slowness, acoustic slowness of drilling fluid (drilling fluid slowness, mud slowness), a ratio of formation density to drilling fluid density, a compressional speed (slowness) of the formation, a diameter of the borehole, etc. The acoustic modes may include a quadrupole mode, a higher order (cut-off) quadrupole mode, a leaky-P mode, a Stoneley mode, a monopole mode, a dipole mode, etc.

The examples described herein may be advantageously used when analyzing acoustic logging measurements when more than one unmeasured parameter exists and those parameters similarly affect the theoretical slowness being determined, for example. One such example occurs when analyzing slowness of the quadrupole mode (quadrupole slowness) because formation shear slowness and drilling fluid slowness, both used in determining a theoretical quadrupole slowness, may be unmeasured and have similar, but not identical, effects on the determined theoretical quadrupole slowness. More specifically, increases in either of the formation shear slowness value or the drilling fluid slowness value increase the value of the theoretical quadrupole slowness determined at any frequency of the signal received.

To identify the optimized pair of values of the formation shear slowness and the drilling fluid slowness, determined theoretical quadrupole slownesses may be compared to the measured quadrupole slowness to identify a best-fit agreement. Using some known approaches, it is difficult to identify a pair of optimized values for formation shear slowness and drilling fluid slowness because different pairs of values may result in a determination of substantially the same theoretical quadrupole slowness. More specifically, when solving for a cost function, $C_2$, to determine the optimized values for formation shear slowness, $S_{sh}$, and drilling fluid slowness values, $S_m$, various values for these parameters may be used when computing the theoretical quadrupole slowness. The formation shear slowness and the drilling fluid slowness similarly affect the computed theoretical quadrupole slowness such that multiple pairs of parameter values that minimize the cost function exist. The pair of values that minimizes the cost function is typically indicative of the optimized pair of values. However, because multiple pairs of parameter values that minimize the cost function exist, the actual optimized pair of parameter values may not be readily identifiable.

Referring to the cost function of Equation 1, $S_i$ corresponds to the measured slowness of the quadrupole mode; $S(f_i; S_{sh}; S_m)$ corresponds to the theoretical slowness of the quadrupole mode; $f_i$ corresponds to the frequency; $S_{sh}$ corresponds to the formation shear slowness, $S_m$ corresponds to drilling fluid slowness and $a_i$ represents weighting of the contribution of each frequency component to the cost function, typically to be proportional to the acoustic energy at that frequency.

Equation 1:

$$C_2(S_{sh}, S_m) = \sum_i a_i |S_i - S(f_i; S_{sh}, S_m)|^2$$

In contrast to the example described above, using the examples described herein, slownesses are measured and theoretically determined using distinct borehole acoustic modes that enable more accurate analysis of the acoustic measurements even if more than one unmeasured parameter exists. Some acoustic modes used in connection with the examples described herein include the quadrupole mode and the leaky-P mode, for example. Each of these distinct borehole acoustic modes has a substantially different sensitivity to variations in formation shear slowness and drilling fluid slowness. Thus, to identify optimized values of the formation shear slowness and the drilling fluid slowness, using the examples described herein, the measured slownesses of the respective acoustic modes may be jointly inverted to identify the parameter values used to generate the theoretical slownesses that most closely fit the measured slownesses.

More specifically, the optimized values of the formation shear slowness and the drilling fluid slowness may be identified by performing a series of forward modeling calculations in which different values of these parameters are used to determine corresponding theoretical slownesses for the respective acoustic modes. The determined theoretical slownesses may be compared to the measured slownesses to identify a best-fit agreement. The optimized parameter values may be the parameter values used to generate the theoretical quadrupole slowness that is substantially similar to the measured quadrupole slowness and the parameter values used to generate the theoretical leaky-P slowness that is substantially similar to the measured leaky-P slowness. While the above examples use two acoustic modes (i.e., the quadrupole mode and the leaky-P mode), a different number (e.g., 2, 3, etc.) of and/or different types of acoustic modes may be used instead. For example, if the examples described herein are employed in connection with a wireline tool, a dipole mode may be used instead of or in addition to the quadrupole mode.

FIG. 1 illustrates a wellsite system 100 in which the examples described herein can be employed. The wellsite system 100 can be onshore or offshore. In this example, a borehole 102 is formed in a subsurface formation F by rotary drilling. However, other drilling methods (e.g., directional drilling) may also be used.

A drillstring 104 is suspended within the borehole 102 and has a bottomhole assembly 106 that includes a drill bit 108 at its lower end. At the surface, the wellsite system 100 includes a platform and derrick assembly 110 positioned over the borehole 102. The platform and derrick assembly 110 includes a rotary table 112, a kelly 114, a hook 116 and a rotary swivel 118. The rotary table 112 may engage the kelly 114 at an upper end of the drillstring 104 to impart rotation to the drillstring 104. The rotary table 112 may be energized by a device or system not shown. The drillstring 104 is suspended from the hook 116 that is attached to a traveling block (also not shown). Additionally, the drillstring 104 is positioned through the kelly 114 and the rotary swivel 118, which permits rotation of the drillstring 104 relative to the hook 116. Additionally or alternatively, a top drive system may be used to impart rotation to the drillstring 104.

In the example depicted in FIG. 1, at the surface, the wellsite system 100 includes drilling fluid or mud 120 that may be stored in a pit 122 formed at the wellsite. A pump 124 delivers the drilling fluid 120 to the interior of the drillstring 104 via a port in the rotary swivel 118, causing the drilling fluid 120 to flow downwardly through the drillstring 104 as indicated by directional arrow 126. The drilling fluid 120 exits the drillstring 104 via ports in the drill bit 108, and then circulates upwardly through the annulus region between the outside of the drillstring 104 and a wall 128 of the borehole 102 as indicated by the directional arrows 130. The drilling fluid 120 lubricates the drill bit 108 and carries formation cuttings up to the surface as the drilling fluid 120 is returned to the pit 122 for recirculation.

The bottomhole assembly 106 of the example illustrated in FIG. 1 includes a logging-while-drilling (LWD) module 132, a measuring-while-drilling (MWD) module 134, another drillstring component 136 such as, a roto-steerable system or mud motor, and the drill bit 108.

The LWD module 132 may be housed in a drill collar 138 and may include one or more logging tools. In some examples, the bottomhole assembly 106 may include an additional LWD module and/or a MWD module as represented by reference numeral 140. As such, references throughout this description to reference numeral 132 may additionally or alternatively include reference numeral 140. The LWD module 132 may include capabilities for measuring, processing, and storing information, as well as for communicating with the surface equipment. Additionally or alternatively, the LWD module 132 may include a seismic measuring device 142.

The MWD module 134 may be also housed in a drill collar 143 and can include one or more devices for measuring characteristics of the drillstring 104 and/or the drill bit 108. Additionally or alternatively, the MWD module 134 may include an apparatus (not shown) for generating electrical power for at least portions of the bottomhole assembly 106, for example. The apparatus for generating electrical power may include a mud turbine generator powered by the flow of drilling fluid. However, other power and/or battery systems may additionally or alternatively be employed. The MWD module 134 may include one or more tools or measuring devices such as, for example, a weight-on-bit measuring device, a torque measuring device, a vibration measuring device, a shock measuring device, a stick slip measuring device, a direction measuring device and/or an inclination measuring device.

During a drilling operation, an example acoustic tool 144 may measure slownesses of different acoustic modes. The measured slownesses may be used to identify unmeasured parameters used for reservoir characterization, decision support, radially imaging the formation, etc. The acoustic tool 144 includes a transmitter 148 and first and second receiver stations 150 and 152 having receivers configured to determine and/or measure slownesses of different acoustic modes at frequencies of the signals received. In addition to identifying the slownesses, the acoustic tool 144 and/or a logging and control computer and/or processor 154 may perform joint inversions of the measured slownesses of the different acoustic modes (e.g., the quadrupole mode and/or the leaky-P mode) to identify parameters associated therewith. In some examples, the identified parameters may include formation shear slowness and drilling fluid slowness, both of which may similarly affect a computed theoretical quadrupole slowness. While the wellsite system 100 depicts the transmitter 148 and the receiver stations 150 and 152 downhole or the transmitter 148 may be positioned uphole and the receiver stations 150 and 152 may be positioned downhole, for example. Any number of transmitters (e.g., 1, 2, 3, etc.) and/or receivers (e.g., 1, 2, 3, etc.) may be used with the acoustic tool 144.

To identify unmeasured parameters associated with measured slownesses of different acoustic modes, the transmitter 148 may transmit an acoustic signal into or along the borehole 102. The acoustic signal is thereafter received by one or more receivers of the receiver stations 150 and 152. The receiver stations 150 and/or 152 may record or log information associated with the quadrupole slowness and frequencies of the signal(s) received. The receivers 150 and/or 152 may record or log information associated with the leaky-P slowness and frequencies of the signal(s) received. While two receiver stations 150 and 152 are described, any number of receiver stations may be included instead (e.g., twelve receiver stations each including four receivers). This information along with any other associated information may be transmitted to a data store 156 and/or 158 for storage.

The information associated with the transmission of acoustic signals stored in the data store(s) 156 and/or 158 may be used by the logging and control computer 154 to perform a joint inversion of the measured slownesses of the quadrupole mode and the leaky-P mode to identify optimized values for parameters such as the formation shear slowness and drilling fluid slowness. In some examples, the logging and control computer 154 may perform a non-linear least squares fitting analysis using the measured slownesses of the respective acoustic modes to estimate the formation shear slowness and drilling fluid slowness associated therewith. In such examples, the logging and control computer 154 may identify the minimized difference between the measured slownesses and theoretical slownesses (e.g., computed slownesses) using varying values for formation shear slowness and varying values for drilling fluid slowness to determine the theoretical slownesses.

The logging and control computer 154 may identify the optimized values of the formation shear slowness and the drilling fluid slowness as those values used to generate the theoretical slownesses that most closely match the measured slownesses of the respective acoustic modes at a frequency (ies) of the received signal. Additionally or alternatively, the logging and control computer 154 may identify the optimized values of the formation shear slowness and the drilling fluid slowness as those values used to generate the theoretical slownesses that minimize the difference between the measured slownesses and the theoretical slownesses of the respective acoustic modes at a frequency(ies) of the received signal.

The logging and control computer 154 may solve an example cost function, $C_3(S_{sh}, S_m)$, to determine an optimized pair of values of the formation shear slowness and drilling fluid slowness that minimizes the difference between the measured slownesses and the theoretical slownesses. More specifically, when determining the optimized pair of values of the formation shear slowness and the drilling fluid slowness, various values for these parameters may be used to compute theoretical quadrupole slownesses. In contrast to the multiple pairs of values resulting in substantially the same solution of the cost function as encountered using Equation 1, using distinct borehole acoustic modes, the cost function of Equation 2 may have a distinct minimum at a point in the formation shear slowness and drilling fluid slowness plane. The values of the formation shear slowness and drilling fluid slowness associated with the identified minimum point may be the optimized values for the respective parameters.

Referring to the cost function of Equation 2, k corresponds to the acoustic mode where when k=1 quadrupole slownesses are being measured and/or determined and when k=2 leaky-P slownesses are being measured and/or determined; $S_i^k$ corresponds to the measured slowness; $S^k(f_i; S_{sh}; S_m)$ corresponds to the theoretical slowness of the k-th mode; $f_i$ corresponds to the frequency of the k-th mode; $S_{sh}$ corresponds to the formation shear slowness, $S_m$ corresponds to drilling fluid slowness and $a_i^k$ represents the energy component of the $i^{th}$ frequency component in the measured acoustic waveform of the k-th mode.

Equation 2:

$$C_3(S_{sh}, S_m) = \sum_{k=1}^{2} \sum_{i} a_i^k |S_i^k - S^k(f_i; S_{sh}, S_m)|^2$$

When determining the theoretical slowness of the quadrupole mode and/or the leaky-P mode, the logging and control computer 154 may assume that the borehole 102 is circular and is filled with drilling fluid 120 having a slowness of $S_m$ that may or may not depend on frequency. When determining the theoretical slowness of the quadrupole mode and/or the leaky-P mode, the logging and control computer 154 may also assume that the formation F is homogeneous and has a formation shear slowness of $S_{sh}$ that does not depend on frequency. The theoretical slowness of the quadrupole mode and/or the leaky-P mode may be determined by the logging and control computer 154 using procedures described in "Influence of a Pipe Tool on Borehole Modes" by Bikash K. Sinha, Ergun Simsek and Sergey Asvadurov (Geophysics Vol. 74, No. 3, May-June, 2009) and incorporated herein by reference in its entirety. The theoretical slowness of the quadrupole mode and/or the leaky-P mode may be a function of frequency. Additional parameter values may be used by the logging and control computer 154 when determining the theoretical slowness of the quadrupole mode and/or the leaky-P mode. Some of these additional parameters may include density of the drilling fluid, density of the formation F, acoustic properties of the bottomhole assembly 106, etc. These additional parameter values may be measured using, for example, one or more components of the bottomhole assembly 106 and/or may be input into the logging and control computer 154.

The logging and control computer 154 may receive information and/or data transmitted from the LWD module 132, the seismic measuring device 142 and/or the MWD module 134. The logging and control computer 154 may analyze results obtained while drilling and/or while drilling is temporarily suspended, for example. The logging and control computer 154 may include a user interface that enables parameters (e.g., processing parameters) to be input and/or outputs to be displayed. While the logging and control computer 154 is depicted uphole and adjacent the wellsite system, a portion of or the entire logging and control computer 154 may be positioned in the drillstring 104, the bottomhole assembly 106 and/or in a remote location.

Although the components of FIG. 1 are shown and described as being implemented in a particular conveyance type, the example methods, systems and apparatus described herein are not limited to a particular conveyance type but, instead, may be implemented in connection with different conveyance types including, for example, coiled tubing, wired drillpipe, wireline and/or any other conveyance types known in the industry.

Figure 2:
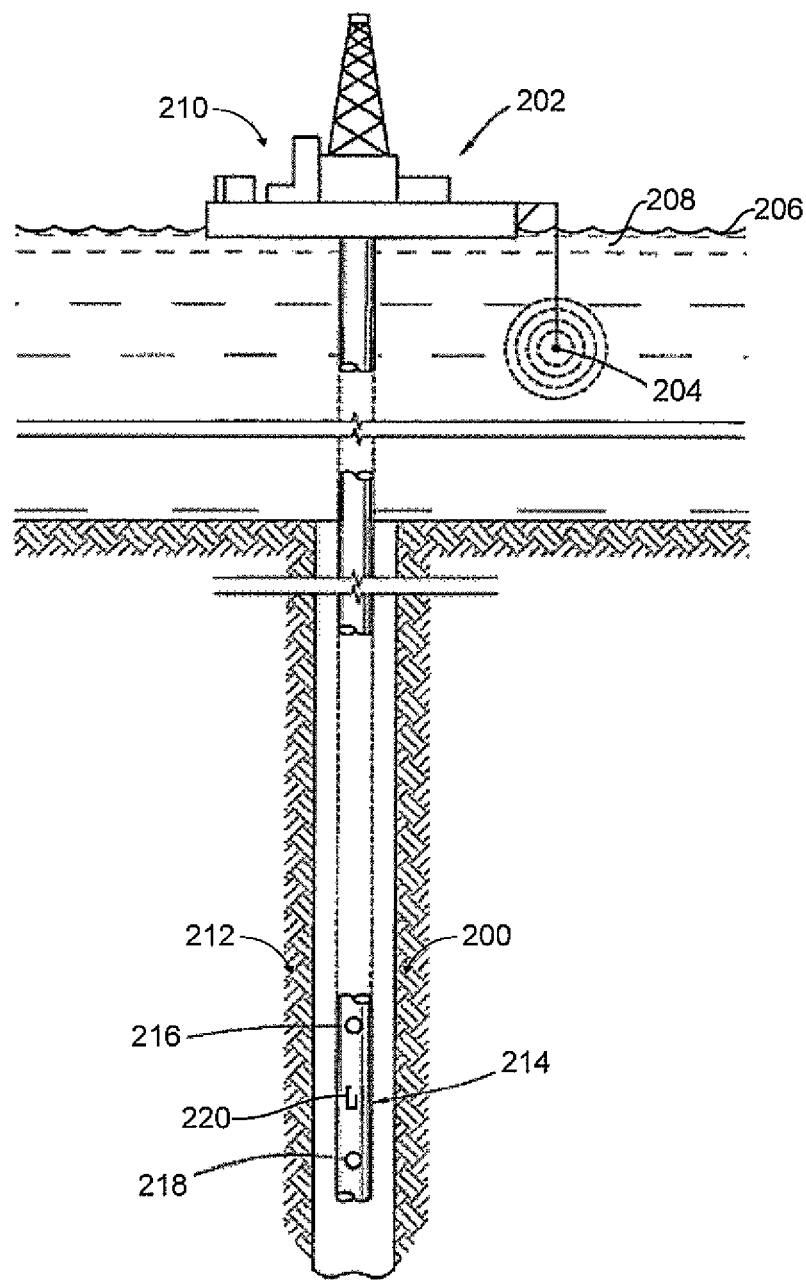
FIG. 2 depicts an example sonic logging-while-drilling tool.

FIG. 2 depicts a sonic logging-while-drilling tool 200 that may be used to implement at least a part of the LWD module 132 of FIG. 1 or which may be part of the LWD module 140 as described in U.S. Pat. No. 6,308,137, which is hereby incorporated herein by reference in its entirety. An offshore rig 202 having a sonic transmitting source or array or transmitter 204 may be deployed near a surface 206 of water 208. Additionally or alternatively, any other type of uphole or downhole source or transmitter may be provided to transmit sonic signals. In some examples, an uphole processor (not shown) may control the firing of the transmitter 204.

The uphole equipment 210 may also include telemetry equipment (not shown) for receiving MWD signals from downhole equipment 212. The telemetry equipment and the recorder are typically coupled to a processor (not shown) so that recordings may be synchronized using uphole and downhole clocks (not shown). In this example, a downhole LWD module 214 includes one or more acoustic receivers 216 and 218. The acoustic receivers 216 and 218 are typically coupled to a signal processor 220 so that recordings may be made of signals detected by the receiver(s) 216 and/or 218 in synchronization with the firing of the signal source (e.g., the transmitter 204).

Figure 3:
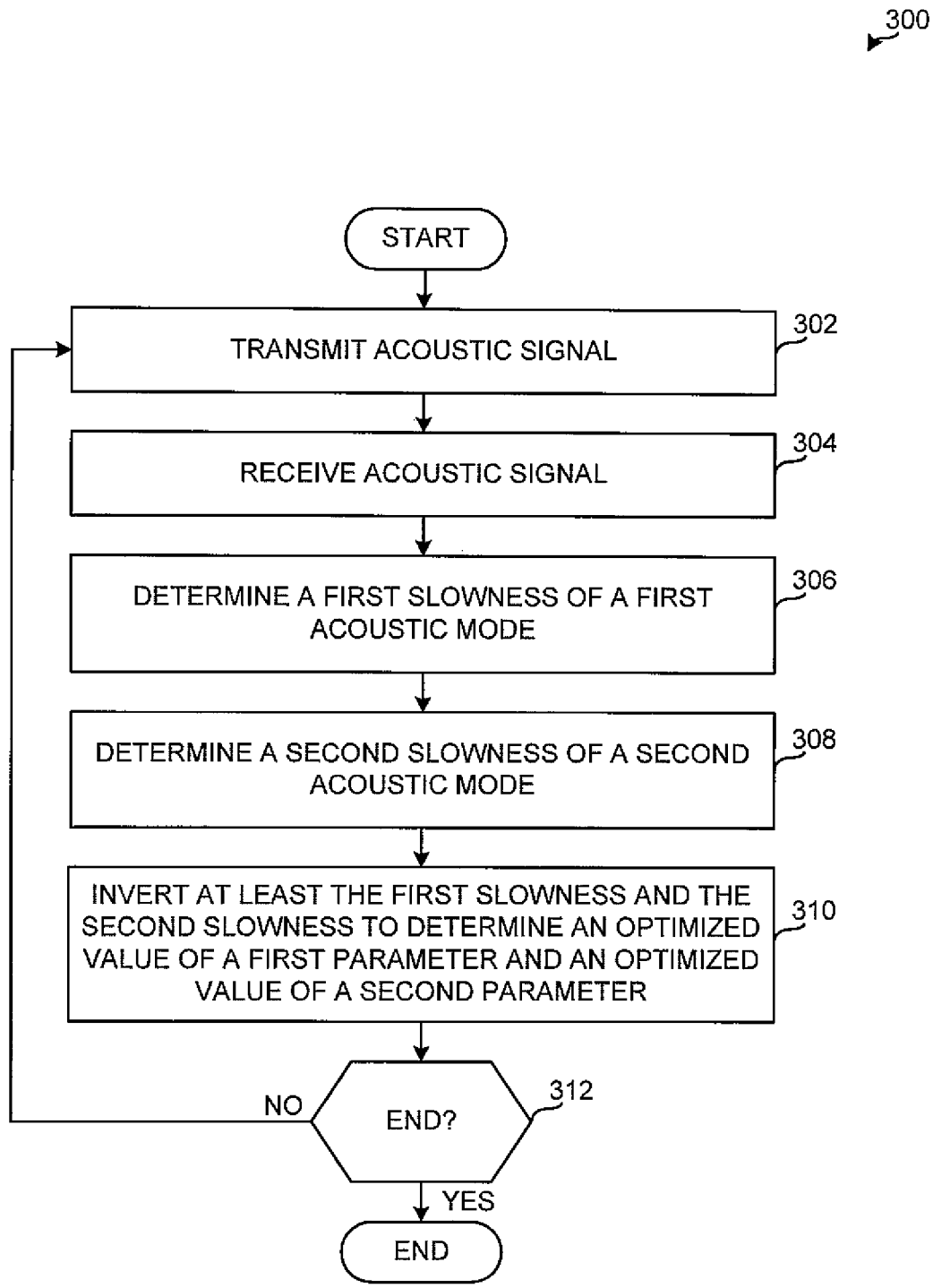
FIG. 3 depicts an example flowchart that can be used to implement the examples described herein to identify optimized values of parameters in a downhole environment.

FIG. 3 depicts an example flow diagram representative of a process or method that may be implemented using, for example, computer readable and executable instructions that may be used to identify optimized values for parameters in a downhole environment. The example process of FIG. 3 may be performed using a processor, a controller and/or any other suitable processing device. For example, the example process of FIG. 3 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 3 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example operations of FIG. 3 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIG. 3 may be implemented manually or as any combination(s) of any of the foregoing techniques, for example, any combination of firmware, software, discrete logic and/or hardware. Further, although the example process of FIG. 3 is described with reference to the flow diagram of FIG. 3, other methods of implementing the process of FIG. 3 may be employed. For example, the order of execution of the blocks may be changed, and/or some of the blocks described may be changed, eliminated, sub-divided, or combined. Additionally, any or all of the example operation of FIG. 3 may be performed sequentially and/or in parallel by, for example, separate processing threads, processors, devices, discrete logic, circuits, etc.

Referring to FIG. 3, the process 300 may begin with the transmitter 148 transmitting an acoustic signal into the borehole 102, (block 302). The transmitted signal is thereafter received by receiver(s) of the receiver stations 150 and 152. (block 304). Either or both of the receiver stations 150 and/or 152 may include receivers that record and/or log information associated with a first acoustic mode and/or a second acoustic mode that is distinct from the first acoustic mode. While not shown, the acoustic tool 144 may include receiver stations that records and/or logs information associated with a third acoustic mode. The third acoustic mode may be the monopole mode or the dipole mode, for example.

The process 300, using information recorded and/or logged by the receiver(s) of the receiver stations 150 and/or 152 and/or associated therewith, may then determine (e.g., using the logging and control computer 154) a first slowness of a first acoustic mode (block 306) and a second slowness of a second acoustic mode (block 308). The first acoustic mode may be the quadrupole mode and the second acoustic mode may be the leaky-P mode. Alternatively, the first acoustic mode may be the dipole mode.

The process 300 may then invert the first slowness and the second slowness to determine an optimized value of a first parameter and an optimized value of a second value. (block 310). The inversion may be a joint inversion in which the parameters being solved for include formation shear slowness and drilling fluid slowness. The inversion may include determining a plurality of theoretical slownesses using different pairs of parameter values to identify which pair of parameter values generates the theoretical slowness that most closely resembles or matches the measured slowness for a frequency of the signal received for both the first and second acoustic modes. The inversion may include performing a non-linear squares fitting analysis to identify the minimized difference between the measured slownesses and the theoretical slownesses using varying values for formation shear slowness and varying values for drilling fluid slowness. The pair of values used to generate the theoretical slownesses that minimizes the difference between the measured and theoretical slownesses of the quadrupole mode and the measured and theoretical slownesses of the leaky-P mode may be identified as the optimized pair of values. Using distinct borehole acoustic modes that have substantially different sensitivities to variations in formation shear slowness and drilling fluid slowness enables the process 300 to readily identify the optimized pair of parameters. In some examples, the process 300 may additionally invert a third slowness associated with a third acoustic mode. The third acoustic mode may have substantially different sensitivities to the first parameter and/or the second parameter.

The process 300 may then determine whether or not to return to block 302. (block 312). Otherwise, the example process 300 is ended.

Figure 4:
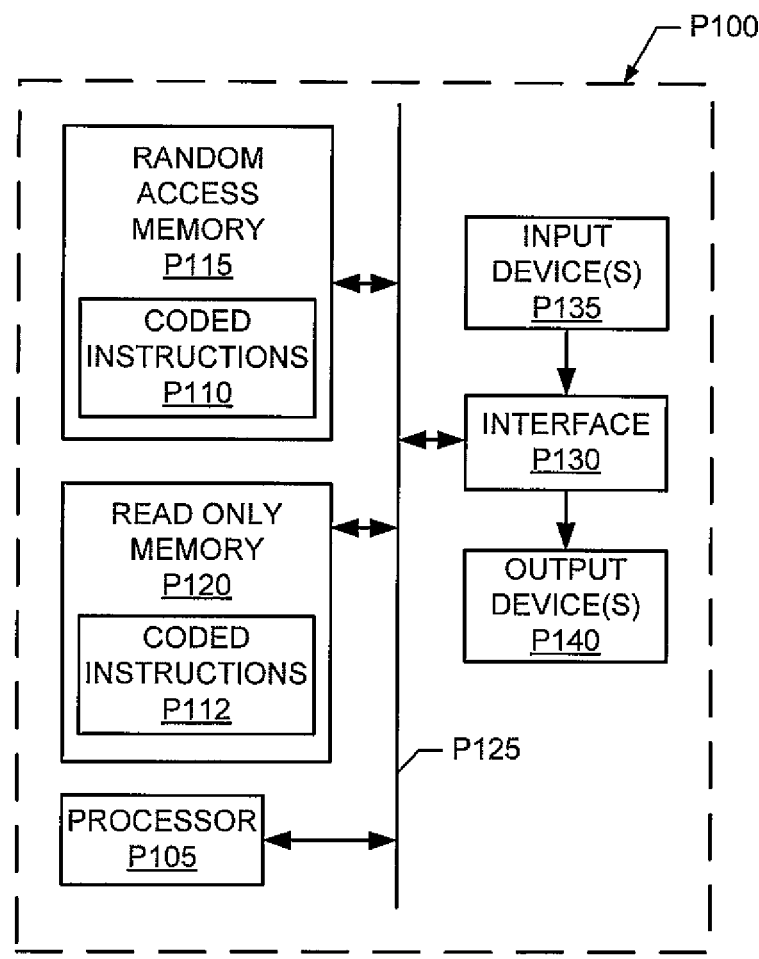
FIG. 4 is a schematic illustration of an example processor platform that may be used and/or programmed to implement any or all of the example methods and apparatus described herein.

FIG. 4 is a schematic diagram of an example processor platform P100 that may be used and/or programmed to implement to implement the logging and control computer 154 and/or any of the examples described herein. For example, the processor platform P100 can be implemented by one or more general purpose processors, processor cores, microcontrollers, etc.

The processor platform P100 of the example of FIG. 4 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods, and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

The examples described herein relate to methods and apparatus that enable values of unmeasured parameters to be optimized in a downhole environment using different acoustic modes. The acoustic modes may have substantially different sensitivities to these unmeasured parameters enabling the pair of parameter values that minimizes a cost function to be readily identifiable. If the examples described herein are used in connection with a logging-while-drilling application, the acoustic modes may include the quadrupole mode and the leaky-P mode. If the examples described herein are used in connection with a wireline tool, the acoustic modes may include the dipole mode and the leaky-P mode.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of optimizing values of a plurality of parameters in a downhole environment having at least one borehole and a plurality of borehole acoustic modes which are acoustic waves in or along the borehole, comprising:

transmitting a signal from a transmitter into a formation;
receiving the signal at a receiver spaced from the transmitter;
determining a first slowness of a first borehole acoustic mode at a plurality of frequencies of the received signal, the first slowness associated with a first parameter and a second parameter;
determining a second slowness of a second borehole acoustic mode at the plurality of frequencies of the received signal, the second slowness associated with the first parameter and the second parameter; and
inverting the first slowness and the second slowness to determine an optimized value of the first parameter and an optimized value of the second parameter, wherein the first and second borehole acoustic modes have substantially different respective sensitivities to each of the first and second parameters.

2. The method of claim 1, wherein jointly inverting the first slowness and the second slowness comprises determining theoretical first slownesses using first and second parameter values and determining theoretical second slownesses using first and second parameter values and identifying one of the theoretical first slownesses that is substantially similar to the determined first slowness and identifying one of the theoretical second slownesses that is substantially similar to the determined second slowness, the optimized value of the first parameter and the optimized value of the second parameter determined from the identified theoretical first slowness and the identified theoretical second slowness.

3. The method of claim 1, wherein the first borehole acoustic mode comprises a quadrupole mode.

4. The method of claim 1, wherein the second borehole acoustic mode comprises a leaky-P mode.

5. The method of claim 1, wherein the second borehole acoustic mode comprises a Stoneley mode.

6. The method of claim 1, wherein the second borehole acoustic mode comprises a cut-off quadrupole mode.

7. The method of claim 1, wherein the first parameter comprises formation shear slowness.

8. The method of claim 1, wherein the second parameter comprises acoustic slowness of drilling fluid.

9. The method of claim 1, further comprising determining a third slowness of a third borehole acoustic mode at the plurality of frequencies of the received signal, the third slowness associated with the first parameter and the second parameter.

10. The method of claim 9, further comprising inverting the third slowness to determine the optimized value of the first parameter and the optimized value of the second parameter.

11. The method of claim 10, wherein the third borehole acoustic mode has substantially different respective sensitivities to at least one of the first parameter or the second parameter than the first borehole acoustic mode or the second borehole acoustic mode.

12. A method of optimizing values of a plurality of parameters in a downhole environment having a borehole, comprising:

transmitting a signal from a transmitter into a formation;
receiving the signal at a receiver spaced from the transmitter;
determining a measured first slowness and theoretical first slownesses of a first borehole acoustic mode at a plurality of frequencies of the received signal, the measured first slowness associated with a first parameter and a second parameter, the theoretical first slownesses determined using first parameter values and second parameter values;

determining a measured second slowness and theoretical second slownesses of a second borehole acoustic mode at the plurality of frequencies of the received signal, the measured second slowness associated with the first parameter and the second parameter, the theoretical second slownesses determined using first parameter values and second parameter values; and inverting the first slowness and the second slowness to determine an optimized value of the first parameter and an optimized value of the second parameter by identifying one of the theoretical first slownesses that is substantially similar to the measured first slowness and one of the theoretical second slownesses that is substantially similar to the measured second slowness, wherein the first and second borehole acoustic modes have substantially different respective sensitivities to each of the first parameter and the second parameter.

13. The method of claim 12, wherein determining the optimized value of the first parameter and the optimized value of the second parameter comprises inverting data associated with the first borehole acoustic mode and data associated with the second borehole acoustic mode.

14. The method of claim 13, wherein the data associated with the first borehole acoustic mode comprises the measured first slowness and the data associated with the second borehole acoustic mode comprises the measured second slowness.

15. The method of claim 12, wherein the optimized value of the first parameter and the optimized value of the second parameter are associated with a minimum value of a difference between the measured slownesses and the respective theoretical slownesses.

16. The method of claim 12, wherein the first borehole acoustic mode comprises a quadrupole mode.

17. The method of claim 12, wherein the second borehole acoustic mode comprises a leaky-P mode.

18. The method of claim 12, wherein the first parameter comprises formation shear slowness.

19. The method of claim 12, wherein the second parameter comprises acoustic slowness of drilling fluid.

20. The method of claim 12, wherein the formation is homogenous when determining the theoretical first slownesses and the theoretical second slownesses.

21. The method of claim 12, wherein the first parameter and the second parameter are independent of the plurality of frequencies when determining the theoretical first slownesses and the theoretical second slownesses.

22. A downhole tool, comprising:
a transmitter to transmit a signal into a subterranean formation;
one or more receivers to receive at least a portion of the acoustic signal; and
a processor configured to determine slownesses of different borehole acoustic modes at a frequency of the signal received, wherein borehole acoustic modes are different acoustic waves in or along a borehole wherein the downhole tool is deployed, wherein each of the slownesses is associated with a first parameter and a second parameter, wherein the different borehole acoustic modes have substantially different sensitivities to each of the first parameter and the second parameter, the processor to invert the determined slownesses of the different borehole acoustic modes to determine an optimized value of the first parameter and an optimized value of the second parameter.

* * * * *